United States Patent [19]
Malik

[11] Patent Number: 5,943,409
[45] Date of Patent: Aug. 24, 1999

[54] METHOD AND SYSTEM FOR PROVIDING AUTOMATIC RECALL INFORMATION IN A TELECOMMUNICATIONS NETWORK

[75] Inventor: Dale W. Malik, Dunwoody, Ga.

[73] Assignee: BellSouth Intellectual Property Corporation, Wilmington, Del.

[21] Appl. No.: 08/893,792

[22] Filed: Jul. 11, 1997

[51] Int. Cl.$^6$ ..................................... H04M 3/48
[52] U.S. Cl. .......................... 379/209; 379/207; 379/230
[58] Field of Search ................................... 379/207, 209, 379/229, 230, 201, 216

[56] References Cited

U.S. PATENT DOCUMENTS

| | | | |
|---|---|---|---|
| 5,311,574 | 5/1994 | Livanos | 379/209 |
| 5,311,583 | 5/1994 | Friedes et al. | 379/209 |
| 5,425,091 | 6/1995 | Josephs | 379/209 |
| 5,430,719 | 7/1995 | Weisser, Jr. | 370/389 |
| 5,479,495 | 12/1995 | Blumhardt | 379/207 |
| 5,537,470 | 7/1996 | Lee | 379/209 |
| 5,572,580 | 11/1996 | Ogata et al. | 379/209 |
| 5,661,790 | 8/1997 | Hsu | 379/209 |
| 5,692,033 | 11/1997 | Farris | 379/209 |
| 5,701,295 | 12/1997 | Bales et al. | 379/209 |
| 5,703,943 | 12/1997 | Otto | 379/209 |
| 5,761,289 | 6/1998 | Keshav | 379/201 |
| 5,784,438 | 7/1998 | Martinez | 379/209 |
| 5,828,729 | 10/1998 | Clermont et al. | 379/230 |
| 5,848,132 | 12/1998 | Morley et al. | 379/209 |
| 5,867,570 | 2/1999 | Bargout et al. | 379/207 |

*Primary Examiner*—Scott Wolinsky
*Attorney, Agent, or Firm*—Nora M. Tocups; Kilpatrick Stockton LLP

[57] ABSTRACT

A method and system for providing an open interface, or access to, information that is stored in a called party switch in relation to an automatic recall telecommunications service. Automatic recall service allows a customer to dial a special feature code and receive an enunciation of the directory number of the last incoming caller Typically, automatic recall-related information is stored in the called party switch and is not accessible to external network elements that may provide enhanced services with this information. This automatic recall-related information may include information such as the directory number of the last incoming caller, the time stamp of the last incoming call, and/or the privacy indicator of the last incoming call. The method includes placing the automatic recall-related information into at least one field of a telecommunications message, such as an ISUP message. The message is routed from the called party switch to the terminating network element that is to provide an enhanced service. The terminating network element may then retrieve the automatic recall-related information from the fields of the message. The terminating network element may then use the automatic recall-related information to provide enhanced services.

16 Claims, 4 Drawing Sheets

METHOD AND SYSTEM FOR PROVIDING AUTOMATIC RECALL INFORMATION IN A TELECOMMUNICATIONS NETWORK

FIELD OF THE INVENTION

The present invention generally relates to telecommunications, and more particularly, relates to a method for providing an open interface to automatic recall service. Even more particularly, the present invention relates to a method for transferring automatic recall-related information from a switch to an external network element.

BACKGROUND OF THE INVENTION

Automatic recall service, also known as call return or *69, is a popular service offered by telecommunications service providers. Automatic recall service typically allows a customer to dial a special feature code and receive an enunciation of the telephone number of the last incoming caller. The customer is also typically presented with the option of calling back the directory number associated with the last incoming caller by dialing another special feature code. Thus, a customer may use the automatic recall service to screen his or her calls or when the customer is unable to answer a call before the calling party hangs up. The automatic recall service also may be used when a customer does not know the directory number of that caller, but wants to call back the last incoming caller.

A typical telecommunications network, such as a Signaling System 7 (SS7) network, implements and provides the automatic recall service as described below. When a calling party dials a directory number of a called party, a communication is routed via conventional means to a switch, or signal switching point (SSP), associated with the directory number of the called party. The switch associated with the directory number of the called party may be referred to as the called party switch. When the communication reaches the called party switch, the called party switch stores the directory number of the calling party in a storage location referred to herein as a line history block. The communication received from the calling party may include a privacy indicator and/or a time stamp. A privacy indicator is a flag that indicates whether or not the calling party has marked the communication as private. If the calling party has marked the communication as private, then the switch may not deliver the directory number of the calling party to the called party switch or to other applications. In addition to a privacy indicator, the communication may include a time stamp. A time stamp is an indication of the time and the date that the communication from the calling party was received by the switch. If the communication includes a privacy indicator and/or a time stamp, most automatic recall systems store the privacy indicator and time stamp in the line history block of the called party switch.

After the calling party's directory number, the time stamp, and/or the privacy indicator are stored in the line history block, then the customer may initiate the automatic recall service by entering a special feature code through the key pad of his or her telephone. The customer may also be referred to herein as the subscriber or called party. Upon receiving the special feature code, the called party switch may locate the stored directory number of the last incoming caller, the stored privacy indicator, and the stored time stamp. The called party switch may then initiate a voice synthesis feature that enunciates the directory number of the last incoming calling party and the time and date of the last incoming call. Typically, the called party switch also provides the option to the subscriber of entering another feature code to automatically call back the directory number of the last calling party. For example, the called party switch, upon receiving the special feature code requesting automatic recall, may enunciate: "Your last call was from 555-1234 at 12:04 PM on Monday, May 4. Please press '1' on your key pad to automatically dial this number."

In a typical automatic recall service, the called party switch examines the privacy indicator before enunciating the directory number of the last incoming caller to the customer. If the privacy indicator denotes that the last incoming caller marked the communication as "private", then the called party switch does not transmit the directory number of the last incoming caller to the customer. If the privacy indicator denotes that the last incoming caller did not mark the communication as "private", then the called party switch transmits the directory number of the last incoming caller to the customer. For example, if the last incoming caller marked the communication as "private", then the called party switch enunciates a message similar to the following message: "Your last call was from a private number at 12:04 PM on Monday, May 4. Please press '1' on your key pad to automatically dial this number."

Although automatic recall service is a convenient and popular service, it does suffer from some drawbacks. One drawback of the automatic recall service is that the information related to the last incoming caller such as the directory number of the last incoming caller, the time stamp, and the privacy indicator, are stored in the line history block of the called party switch. The called party switch may enunciate the calling party's directory number and/or the time and date that the last incoming call was received. In addition, the called party switch determines whether or not the last incoming call was private. However, the called party switch has limited intelligence. Thus, the called party switch cannot perform many enhanced services that are convenient or may be desired by the customer.

For most enhanced services, an intelligent, external network element is required. Using present automatic recall services, there is no means for transferring the automatic recall-related information from a called party switch to an external network element, or external application, so that the external application may use the automatic recall-related information to provide enhanced services. A telecommunications service provider which can provide these enhanced services will enjoy a distinct advantage over competitors.

Thus, there is a need in the art for a method and system for transmitting the automatic recall-related information from a switch to an external network element so that enhanced services may be provided.

SUMMARY OF THE PRESENT INVENTION

Stated generally, the present invention provides a system and method for providing automatic recall-related information stored in a service switching point to a terminating network element, also referred to as an external network element, of a telecommunications network. The information may be placed into a plurality of fields of a message, such as an Integrated Services Digital Network User Part (ISUP) message. The message may be routed from the service switching point to a terminating network element. The terminating network element may retrieve the automatic recall-related information from the fields of the message. The terminating network element may then use the automatic recall-related information to provide enhanced services.

More particularly, in one embodiment, the telecommunications network includes a first and second subscriber terminal unit functionally connected to the service switching point. In this embodiment, the automatic recall-related information is information regarding a communication from the first subscriber terminal unit to the second subscriber terminal unit. The information regarding the communication from the first subscriber terminal unit to the second subscriber terminal unit is placed into a plurality of fields of the message. The automatic recall-related information may include a directory number of the first subscriber terminal unit, a time stamp of the communication, and/or a privacy indicator of the communication.

In one embodiment, the message may be an Integrated Services Digital Network User Part (ISUP) message. If an ISUP message is utilized, the directory number of the first subscriber terminal unit may be placed into a calling party field of the ISUP message. The time stamp may be placed into a second redirecting party field of the ISUP message and a directory number of the second subscriber terminal unit may be placed into an original called party field of the ISUP message. The ISUP message may be routed to the external network element over an SS7 network using an Open Route Directory Number (ORDN). The ORDN is a ten-digit parameter that defines the directory number of the terminating network element. The automatic recall-related information may be retrieved by causing the terminating network element to read the calling party field, the second redirecting party field, and the original called party field of the ISUP message.

In still another embodiment, the method may include causing the service switching point to trigger on a feature activation code and transmit automatic recall-related information to an SCP in a Transactional Capabilities Application Part (TCAP) message. The SCP may then transmit the automatic recall-related information to a terminating network element over a data link. The SCP may also connect the subscriber terminal unit of the called party to the terminating network element for handling of the enhanced service.

It is an object of the present invention to provide a method and system for transmitting automatic recall-related information from a switch to an external network element so that enhanced services may be provided. Advantageously, the embodiments of the present invention provide an open interface to automatic recall-related information of an automatic recall service. The external network element may use the automatic recall-related information to provide enhanced services.

Other features and advantages of the present invention will be apparent to persons skilled in the art from the following detailed description of a preferred embodiment accompanied by the attached drawings wherein identical reference numerals refer to like parts and steps in the various views.

DETAILED DESCRIPTION

Figure 1:
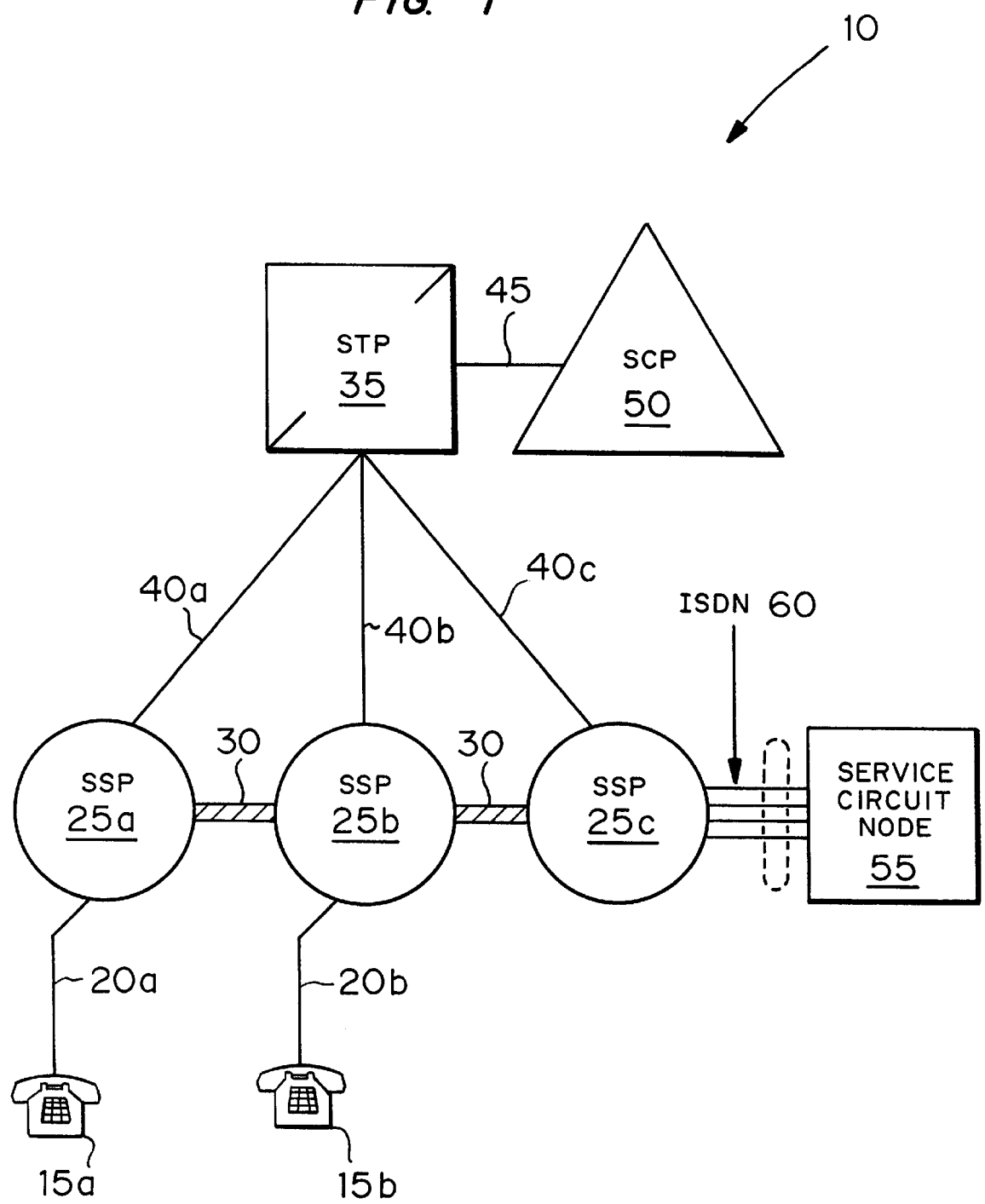
FIG. 1 is a block diagram illustrating the preferred environment for embodiments of the present invention.

This detailed description provides first a general description of the present invention, and then provides a description of the preferred environment (FIG. 1) for embodiments of the present invention. The detailed description concludes with a more particular description of the present invention through the use of flow charts describing an exemplary embodiment (FIG. 2), the preferred embodiment (FIG. 3), and an alternative embodiment (FIG. 4) with reference to the preferred environment (FIG. 1).

Generally described, the present invention provides a method and system for providing an open interface, or access, to automatic recall-related information of an automatic recall service. Automatic recall service, also known as call return or *69, allows a customer to dial a special feature code and receive an enunciation of the directory number of the last incoming caller. The customer is also typically presented with the option of calling back the directory number of the last incoming caller by dialing another special feature code. In a typical implementation of automatic recall service, automatic recall-related information is stored in a line history block of a switch associated with the directory number of the called party. The switch associated with the directory number of the called party may be referred to as the called party switch. Automatic recall-related information may include information such as the directory number of the last incoming caller, the time stamp of the last incoming call, and/or the privacy indicator of the last incoming call, along with other data. Automatic recall service is described in detail in the Background section.

Thus, generally described, the present invention provides an open interface to automatic recall-related information. Providing an open interface to automatic recall-related information generally refers to transferring the automatic recall-related information to an external network element. The term "external network element", or "terminating network element", is used herein to refer to any network element or application in the telecommunications network that is functionally connected to the called party switch that stores the automatic recall-related information. An external network element may use the automatic recall-related information to provide enhanced services which the called party switch can not, or does not, provide.

In one embodiment, the method of the present invention begins when the called party switch receives an indication that the subscriber, i.e., the called party, has dialed a special feature code, such as *69. The switch retrieves the automatic recall-related information from a line history block and places this information in a plurality of Integrated Services Digital Network User Part (ISUP) message fields. The switch transmits the automatic-recall related information to an external network element by using an Open Route Directory Number (ORDN) to route a communication over an SS7 equipped network utilizing ISUP protocol. The external network element will receive the ISUP message as part of the communication setup and may read the automatic recall-related information from the ISUP message fields. The external network element may use the automatic-recall related information to perform enhanced services.

As known to those skilled in the art, ISUP is an acronym for Integrated Services Digital Network User Part. ISUP is the call control portion of the well-known signaling protocol known as Signaling System 7 (SS7) protocol. ISUP determines the procedures for setting up, coordinating, and taking down trunk calls in an SS7 network. ISUP also provides trunk management, call status checking, and calling party number information. In one embodiment, the present invention uses a plurality of fields of an ISUP message to transfer automatic recall-related information from the called party switch to an external network element.

In another embodiment, the present invention uses a Transactional Capabilities Application Part (TCAP) message to transmit automatic recall-related information from a called party switch to an SCP. The SCP may then use an Open Route Directory Number (ORDN) to send the automatic recall-related information to an external network element over a data link. As known to those skilled in the art, TCAP is an acronym for Transactional Capabilities Application Part. TCAP provides a signaling function that supports transaction-based information exchange between network entities. TCAP enables a network entity to access an SCP to process a communication.

Having generally described the present invention, a description of the preferred environment (FIG. 1) and operation of exemplary embodiments of the present invention therein are now provided. FIG. 1 is a block diagram illustrating a telecommunications network 10, and in particular, the typical interconnection of network elements such as may be present in the public switched telephone network (PSTN) and Advanced Intelligent Network (AIN) elements thereof. Additional information regarding the telecommunications network 10 may be obtained from the commonly assigned patent to Weisser, Jr. U.S. Pat. No. 5,430,719, which is incorporated by reference herein. The elements of FIG. 1 are used in FIGS. 2, 3, and 4 to describe embodiments of the present invention.

Referring to FIG. 1, the present invention operates in connection with a communication placed by an originating caller using a terminating unit, such as unit 15a. The communication is routed in a conventional manner through the telecommunications network 10 to a terminating unit, such as unit 15b. Although telephones are illustrated as the terminating units in FIG. 1, those skilled in the art will understand that such units may include other telecommunications devices such as facsimile machines, computers, modems, etc.

As noted, one of the illustrated terminating units 15a is designated as corresponding to the originating caller (also referred to as "calling party", "caller", or "source"). Another of the terminating units 15b is designated as corresponding to the receiving party (also referred to as the "called party", "subscriber", or "destination"). Although an originating caller is generally referred to herein as a person, those skilled in the art will understand that an originating caller may be a device such as a facsimile machine, computer, modem, etc. Also as noted, the present invention operates in connection with a "communication". The term "communication" is used herein to include all messages known to those skilled in the art that may be exchanged between an originating caller and a network element, terminating unit, or person answering a call.

As further illustrated in FIG. 1, each of the terminating units 15a and 15b is shown as connected by a respective subscriber line 20a and 20b to a central office (A and B) 25a and 25b. Also shown is central office (C) 25c. These central offices are preferably SSP switches (also referred to as SSPs). SSP is an acronym for service switching point. Generally, an SSP includes intelligent network functionality including appropriate hardware and software so that, when a set of predetermined conditions are detected, the SSP initiates a trigger for a predetermined state of a call on a subscriber's directory number, generates the trigger as an appropriate message to be sent out over the telecommunications network, and suspends handling of a call until the SSP receives a reply from the network instructing the SSP to take certain action.

Still referring to FIG. 1, central offices 25a, 25b, and 25c are interconnected by a plurality of trunk circuits indicated as 30 in FIG. 1. These are the voice path trunks that interconnect the central offices to connect communications. As those skilled in the art will understand, each of the central offices 25a, 25b, and 25c is connected to a local signal transfer point (STP) 35 via respective data links 40a, 40b, and 40c. Also connected to STP 35 over data link 45 is the local service control point (SCP) 50. As is known to those skilled in the art, among the functions performed by SCPs is the maintenance of network databases which are used in providing services and, in particular, in providing enhanced telecommunications services. In addition, SCPs include databases that identify particular service subscribers and the services to be accorded to these subscribers. All of these network elements (SSPs, STPs and SCPs) operate pursuant to the well-known signaling protocol referred to as the Signaling System 7 (SS7) protocol.

In order to keep the processing of data and calls as simple as possible, a relatively small set of triggers is defined at the central offices for each call. A trigger in the Advanced Intelligent Network is an event associated with a particular subscriber line that generates a packet to be sent to an SCP. The trigger causes the SCP to query its database to determine which customized calling feature or enhanced service should be implemented for this particular call. The results of the database inquiry are sent back to the central office from SCP 50 through STP 35. The return packet includes instructions to the central office as to how to process the call. The instruction may be to take some special action as a result of a customized calling service or enhanced feature. In response to receiving the latter type message, the central office moves through its call states, collects the called digits, and generates further packets that are used to set up and route the call. Similar devices for routing calls among various local exchange carriers are provided by regional STPs (not shown) and regional SCPs (not shown).

The illustrated telecommunications network 10 also includes a terminating network element and, in particular, includes a service circuit node 55 as the terminating network element shown in FIG. 1. However, it should be understood that the terminating network element may also be a switch, an SCP, a computer, a node, as well as other terminating network elements known to those skilled in the art. Those skilled in the art will be familiar with these terminating network elements including service circuit nodes, which are generally implemented by the same types of computers that embody the service control point 50. In addition to the computing capability and database maintenance features, service circuit node 55 also includes voice and dual tone multifrequency (DTMF) signal recognition devices and voice synthesis devices. Service circuit node 55 may be connected to other telecommunication network elements as necessary or appropriate.

Service circuit nodes, such as service circuit node 55, are used principally when some enhanced feature or service is needed that requires an audio connection to the call or transfer of a significant amount of data to a caller over a switched connection during or following a call. As shown in FIG. 1, service circuit node 55 is typically connected to one or more (but normally only a few) central offices via an Integrated Service Digital Network (ISDN) interface connection such as the connection 60 between service circuit node 55 and central office C 25c. Preferably, this ISDN interface connection 60 constitutes ISDN basic rate interface (BRI) lines. Thus, a service circuit node may be viewed as a smart termination connected to an ISDN interface connection that may be used to provide enhanced or special services. Having generally described the preferred environment in which the present invention is implemented, an exemplary embodiment of the present invention will be described below in reference to FIG. 2.

Figure 2:
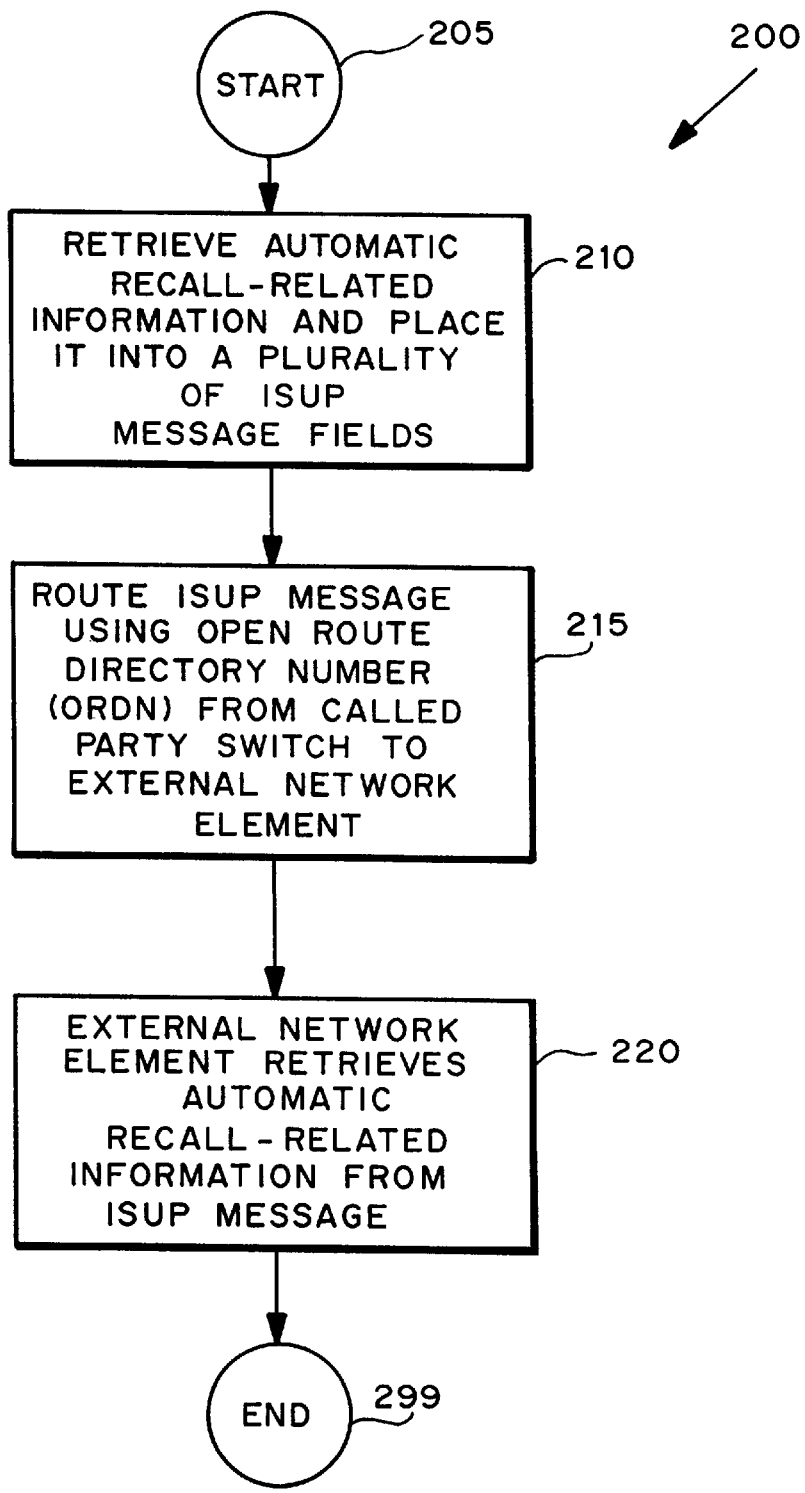
FIG. 2 is a flow chart illustrating a method for providing an open interface to automatic recall-related information in accordance with an exemplary embodiment of the present invention.

A flow chart illustrating a method 200 for providing an open interface, or access, to automatic recall-related information in accordance with an embodiment of the present invention is provided in FIG. 2 with reference to the telecommunication network 10 of FIG. 1. Prior to the performance of method 200, the following events generally occur in telecommunications network 10. Those skilled in the art will recognize these events as those events that typically occur in an automatic recall service. Referring to FIG. 1, an originating caller places a communication to a called party's directory number. The communication is routed in a conventional fashion over a voice path connection from originating unit 15a to its serving central office 25a. The communication is further routed in a conventional fashion over a voice path connection from central office 25a through the network 10 as necessary to the central office 25b serving the called party's unit 15b. For this communication example, central office 25b will also be referred to as called party switch 25b. Automatic recall-related information such as a directory number of the originating unit 15a and a time stamp and/or a privacy indicator of the communication is stored in the line history block (not shown) of called party switch 25b.

Referring now to FIG. 2, the method 200 begins at step 205 and proceeds to step 210 when the called party switch 25b receives an indication that the called party has dialed a special feature code on the keypad of called party's unit 15b. The special feature code may be *69 or another special feature code. At step 210, the called party switch 25b retrieves the automatic recall-related information and places it into a plurality of ISUP message fields of an ISUP message. The method then proceeds to step 215.

At step 215, the ISUP message, including the automatic recall-related information, is routed from the called party switch 25b to an external network element, such as service circuit node 55, using an Open Route Directory Number (ORDN). The ORDN is a 10-digit NPA-NXX parameter that is associated with the special feature code entered by the user. The ORDN is a unique parameter of the present invention and is used to route the ISUP message containing the automatic recall-related information. The ORDN comprises the directory number of the external network element. Using the directory number provided in the ORDN, the ISUP message is routed in a conventional manner to the external network element. The method then proceeds to step 220.

The external network element, such as service circuit node 55, retrieves the automatic recall-related information from the ISUP message fields at step 220. The method then ends at step 299.

The external network element may use the automatic recall-related information to perform enhanced services in a conventional manner after retrieving the information from the ISUP message fields. For example, the service circuit node 55 may provide the called party with a voice enunciation of the calling party's name, such as "Your last call was from Dale Malik at 12:04 PM on Monday, May 4. Please press '1' on your key pad to automatically dial this number." In the past, this voice enunciation of the last caller's name was impossible because the service circuit node 55 could not access automatic recall-related information such as the directory number of the originating unit 15a. However, using the present invention, this information may be sent to the service circuit node or another external network element in an ISUP message so that an enhanced service may be provided using this information.

It should be understood that many different enhanced services may be provided using the present invention. Generally, any enhanced service which uses automatic recall-related information may be performed with the present invention. For example, the present invention may be used to send a voicemail message to the last incoming caller. As another example, if the directory number of the last incoming caller is busy, then the present invention may be used to call the called party when the directory number of the last incoming caller is no longer busy. As will be understood by those skilled in the art, a variety of different enhanced services may be performed using the automatic-recall related information.

It should be understood that the external network element described above must be provided with some intelligence, such as by programming, so that the automatic recall-related information may be retrieved from the ISUP message. In particular, the external network element must be provided with intelligence to recognize which ISUP message fields contain the automatic recall-related information.

Having described an exemplary embodiment of the present invention in reference to FIG. 2, the preferred embodiment of the present invention is described below with reference to FIG. 3.

Figure 3:
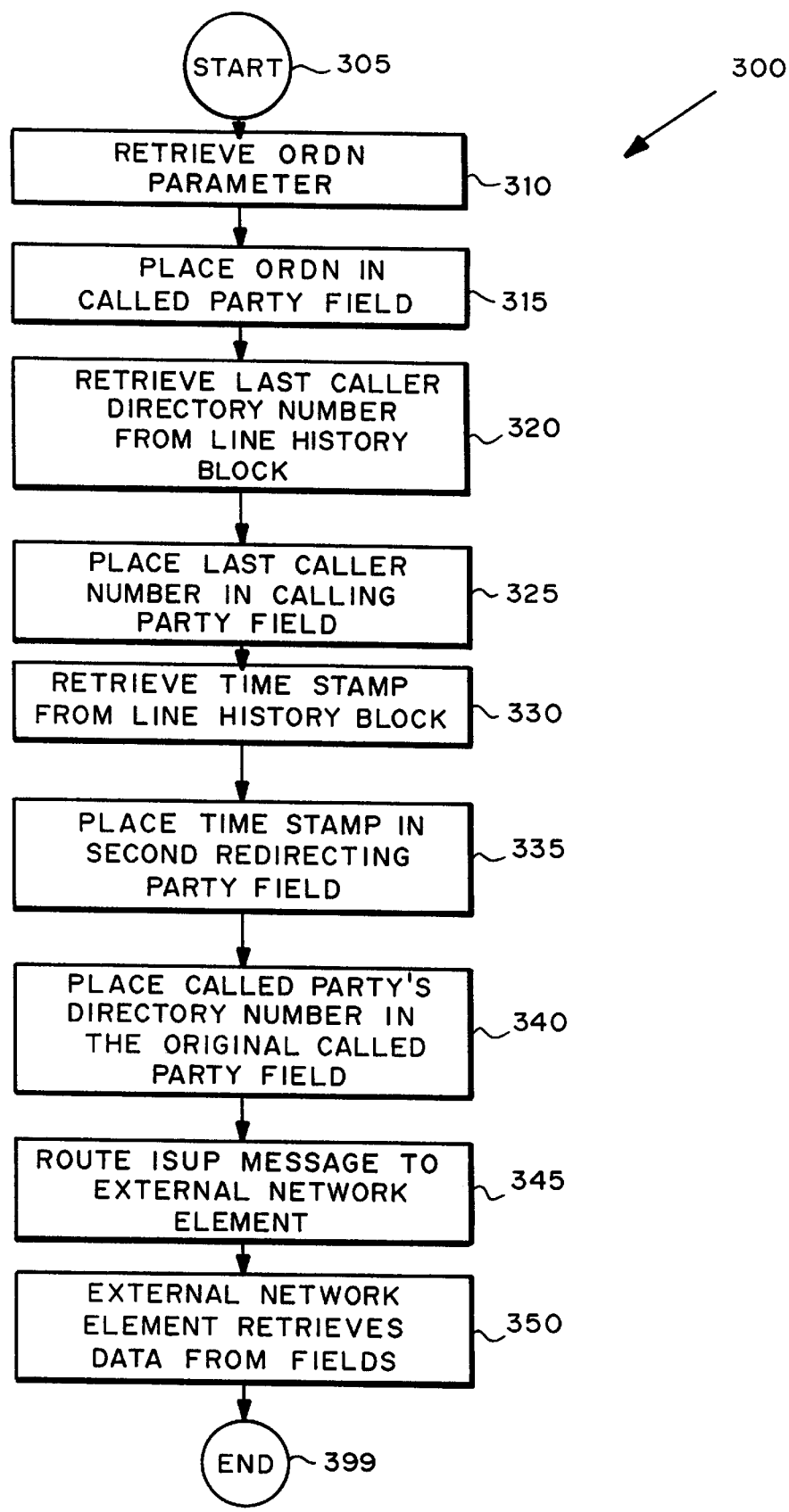
FIG. 3 is a flow chart illustrating the preferred method for providing an open interface to automatic recall-related information.

A flow chart illustrating the preferred method 300 for providing an open interface, or access, to automatic recall-related information is provided in FIG. 3 with reference to the telecommunication network 10 of FIG. 1. Prior to the execution of method 300, the following events may occur in telecommunications network 10. Those skilled in the art will recognize these events as those events that typically occur in an automatic recall service. Referring to FIG. 1, an originating caller places a communication to the called party's directory number. The communication is routed in a conventional fashion over a voice path connection from originating unit 15a to its serving central office 25a. The communication is further routed in a conventional fashion over a voice path connection from central office 25a through the network 10 as necessary to the central office 25b serving the called party's unit 15b. For this communication example, central office 25b will also be referred to as called party switch 25b. Automatic recall-related information such as a directory number of the originating unit 15a and a time stamp and/or a privacy indicator of the communication is stored in the line history block (not shown) of called party switch 25b.

Referring now to FIG. 3, the method 300 begins at step 305 and proceeds to step 310 when the called party switch 25b receives an indication that the called party has entered a feature activation code to activate an enhanced service such as automatic recall. Feature activation codes are well-known to those skilled in the art. At step 310, the called party switch 25b retrieves an Open Route Directory Number (ORDN). The ORDN is a 10-digit NPA-NXX parameter that is associated with the special feature code entered by the user. The ORDN is a unique parameter of the present invention and is used to route the ISUP message containing the automatic recall-related information.

At step 315, the called party switch 25b places the ORDN parameter into the called party field of an ISUP message. The ORDN contains the directory number of the external network element required to perform the enhanced service requested by the user.

The called party switch 25b retrieves the directory number of the last incoming caller from its line history block at step 320. For the communication described above, the directory number of the last incoming caller is the directory number of originating unit 15a. The called party switch 25b places the directory number of the last incoming caller in the calling party field of the ISUP message at step 325.

The called party switch 25b retrieves the time stamp of the communication, i.e., the time stamp of the last incoming call, from its line history block at step 330. The called party switch 25b places the time stamp in the second redirecting party field of the ISUP message at step 335.

At step 340, the switch places the called party's directory number in the original called party field of the ISUP message. For the communication described above, the called party's directory number is the directory number of called party's unit 15b.

At step 345, the switch routes the ISUP message to an external network element via conventional means. The external network element which receives the ISUP message is determined by the directory number of the external network element stored in the ORDN parameter.

At step 350, the external network element retrieves the automatic recall-related information from the ISUP message. The external network element may be provided, or programmed, with the ability to read the ISUP message and retrieve the automatic recall-related information that is embedded in the ISUP message. The method then ends at step 399.

Having described the preferred method 300 for providing access to automatic recall-related information in reference to FIG. 3, an alternative method 400 for providing access to automatic recall-related information will be provided below in reference to FIG. 4.

Prior to the execution of method 400, the following events may occur in telecommunications network 10. Those skilled in the art will recognize these events as those events that typically occur in an automatic recall service. Referring to FIG. 1, an originating caller places a communication to the called party's directory number. The communication is routed in a conventional fashion over a voice path connection from originating unit 15a to its serving central office 25a. The communication is further routed in a conventional fashion over a voice path connection from central office 25a through the network 10 as necessary to the central office 25b serving the called party's unit 15b. For this communication example, central office 25b will also be referred to as called party switch 25b. Automatic recall-related information such as a directory number of the originating unit 15a and a time stamp and/or a privacy indicator of the communication is stored in the line history block (not shown) of called party switch 25b.

Figure 4:
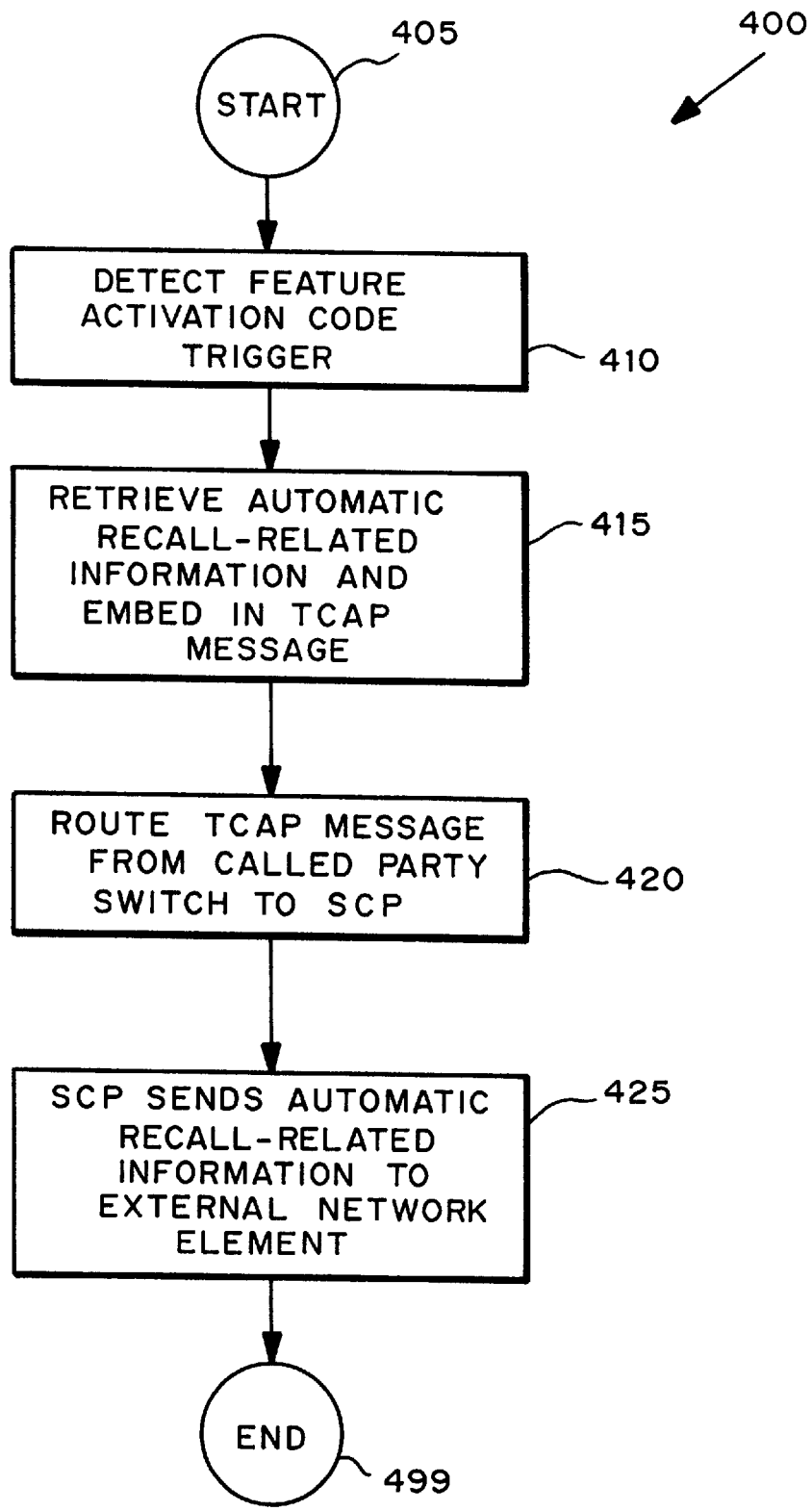
FIG. 4 is a flow chart illustrating an alternative method for providing an open interface to automatic recall-related information using a TCAP message.

Referring now to FIG. 4, the method 400 begins at step 405 and proceeds to step 410 where a feature code activation trigger is detected at switch 25b (FIG. 1). After the trigger is detected at step 410, automatic recall-related information stored in the line history block of switch 25b is embedded in a Transactional Capabilities Application Part (TCAP) message. It should be understood that conventionally when a switch detects a feature code activation trigger for automatic recall, such as *69, the switch sends a TCAP message that includes the directory number of the caller to an SCP. Using the embodiment of the present invention described in FIG. 4, at step 415, automatic recall-related information is embedded in the fields of the TCAP message along with the directory number of the last incoming caller. The automatic recall-related information may comprise information such as the directory number of the originating unit 15a, a time stamp, and/or a privacy indicator of the communication.

At step 420, the TCAP message, including the embedded automatic recall-related information, is routed to the SCP associated with the called party switch. For example, referring to FIG. 1, the TCAP message may be routed to SCP 50 based upon the feature code activation trigger detected at switch 25b.

At step 425, the SCP delivers the automatic recall-related information to the terminating network element over a data link. The SCP also routes a communication to the terminating network element so that enhanced services may be provided to the called party who dialed the feature code activation trigger. The method then ends at step 499.

Alternatively, at step 425, the SCP may receive the automatic recall-related information and store the automatic recall-related information. The external network element may then send a query to the SCP requesting the automatic recall-related information that is needed by the external network element. The SCP may send the automatic recall-related information to the external network element via a data link. For example, SCP 50 may send the automatic recall-related information to service circuit node 55 via ISDN connection 60 based upon a query from service circuit node 55.

It should be understood that the method 400 for retrieving automatic recall-related information (FIG. 4) eliminates the need for the external network element to be provided with intelligence to read an ISUP message. Instead, the SCP is provided with intelligence to read a TCAP message including automatic recall-related information. The SCP may receive the TCAP message, including the automatic recall-related information embedded in the TCAP message, and send the required information to the external network element, preferably via a data link.

It should also be understood that the method 400 for retrieving automatic recall-related information illustrated in FIG. 4 allows the external network element access which might typically be denied due to the privacy indicator. For example, before delivering the automatic recall-related information to an external network element, the called party switch may look at a privacy indicator and, if marked private, the called party switch may not deliver the last caller's name or number. However, the switch will deliver this information to an SCP. Thus, by using the preferred method illustrated in FIG. 4, the automatic recall-related information may be delivered to the external network element by first being delivered to an SCP. Then, the SCP may perform enhanced services with the name associated with the directory number of the last incoming caller while maintaining the privacy of the directory number of the last incoming caller. For example, the SCP may enunciate the name associated with the directory number of the last incoming caller without enunciating the directory number of the last incoming caller.

It should be understood by those skilled in the art that embodiments of this invention will work with all devices, such as cellular telephones, that have ISUP, SS7, or TCAP capability. It should be further understood that, although the terminating network element, or external network element, has been described herein as a service circuit node, the terminating network element may be any network element with the features described below. For embodiments of the present invention utilizing an ISUP message, the terminating network element may have ISDN capability to read an ISUP message during call set-up. For embodiments of the present invention utilizing a TCAP message, the terminating network element may have the capability of communicating with an SCP over a data link.

It should still be further understood that the present invention may be used with automatic recall-related information or any other information stored in a switch. Any information stored in a switch may be delivered, based on a feature activation code, to any external network element.

The present invention is an improvement upon the prior art automatic recall services. The present invention uniquely allows external network elements access to automatic recall-related information. The external network element may provide enhanced services that the called party switch can not, or does not, provide. The present invention also preferably provides a unique method and system for retrieving the automatic recall-related information so that the external network element does not have to be provided with extensive intelligence to read an ISUP message. Instead, an embodiment of the present invention delivers the automatic recall-related information to an SCP which stores the information and delivers the required information to an external network element attached to the SCP.

Given the foregoing disclosure of the preferred embodiment and design parameters for the present invention, other embodiments of the present invention will suggest themselves to those skilled in the art. Therefore, the scope of the present invention is to be limited only by the claims below.

I claim:

1. In a telecommunications network including a terminating network element connected to a service switching point, a method for providing automatic recall-related information of an automatic recall service stored in said service switching point to said terminating network element, said method comprising the steps of:

placing said automatic recall-related information into at least one field of a message;

routing said message from said service switching point to said terminating network element; and causing said terminating network element to retrieve said automatic recall-related information from said field of said message, whereby said terminating network element may use said automatic recall-related information to provide enhanced services.

2. The method recited in claim 1, wherein said telecommunications network further includes a first subscriber terminal unit functionally connected to said service switching point and a second subscriber terminal unit functionally connected to said service switching point;

wherein said automatic recall-related information comprises information regarding a communication from said first subscriber terminal unit to said second subscriber terminal unit; and wherein said step of placing said automatic recall-related information into at least one field of a message comprises placing said information regarding a communication from said first subscriber terminal unit to said second subscriber terminal unit into at least one field of a message.

3. The method recited in claim 2, wherein said automatic recall-related information comprises a directory number of said first subscriber terminal unit, a time stamp of said communication, and a privacy indicator of said communication.

4. The method recited in claim 3, wherein said message is an Integrated Services Digital Network User Part (ISUP) message; and wherein said step of placing said automatic recall-related information into at least one field of a message comprises the following sub-steps:

placing said directory number of said first subscriber terminal unit into a calling party field of said ISUP message;

placing said time stamp into a second redirecting party field of said ISUP message; and placing a directory number of said second subscriber terminal unit into an original called party field of said ISUP message.

5. The method recited in claim 4, wherein said step of retrieving said automatic recall-related information comprises the sub-step of:

causing said terminating network element to read said calling party field, said second redirecting party field, and said original called party field of said ISUP message, whereby said directory number of said first subscriber terminal unit, said time stamp, and said directory number of said second subscriber terminal unit are retrieved.

6. The method recited in claim 1, wherein said message is an Integrated Services Digital Network User Part (ISUP) message and said step of placing said automatic recall-related information into at least one field of a message comprises placing automatic recall-related information into at least one field of said ISUP message.

7. In a telecommunications network including an external network element connected to a switch and a service control point, a method for providing automatic recall-related information of an automatic recall service to said external network element, said automatic recall-related information being stored in said switch, said method comprising the steps of:

causing said switch to place said automatic recall-related information into a plurality of fields in a message;

causing said switch to transmit said message to said service control point; and causing said external network element to retrieve said automatic recall-related information from said service control point.

8. The method recited in claim 7, further comprising the step of causing said switch to retrieve a parameter, said parameter identifying said service control point, whereby said switch may be caused to transmit said message to said service control point.

9. The method recited in claim 8, further comprising the step of causing said switch to place said parameter in one of said plurality of fields in said message.

10. In a telecommunications network including a terminating network element connected to a service switching point and a service control point, a method for providing said terminating network element with access to automatic recall-related information of an automatic recall service stored in said service switching point, said automatic recall-related information relating to a communication between a first subscriber terminal unit connected to said service switching point and a second subscriber terminal unit connected to said service switching point, said method comprising the steps of:

retrieving a directory number of said first subscriber terminal unit from a line history block of said service switching point;

retrieving a time stamp of said communication from said line history block of said service switching point;

inserting said directory number of said first subscriber terminal unit into a first field of a message;

inserting said time stamp into a second field of said message;

inserting a directory number of said second subscriber terminal unit into a third field of said message; and routing said message to said terminating network element.

11. The method recited in claim 10, further comprising the step of retrieving a parameter identifying said terminating network element.

12. The method recited in claim 11, further comprising the step of inserting said parameter in a fourth field of said message.

13. The method recited in claim 12, further comprising the step of retrieving from said message said directory number of said first subscriber terminal unit, said time stamp, and said directory number of said second subscriber terminal unit.

14. The method recited in claim 13, further comprising the steps of:

detecting a trigger on a directory number of said terminating network element;

routing said message to said service control point;

storing said directory number of said first subscriber terminal unit and said time stamp in said service control point;

receiving a request from said terminating network element for said directory number of said first subscriber terminal unit and said time stamp; and causing said service control point to transmit said directory number of said first subscriber terminal unit and said time stamp to said terminating network element.

15. The method recited in claim 14, wherein said message is a Transactional Capabilities Application Pair (TCAP) message.

16. In a telecommunications network including a terminating network element connected to a service switching point, a system for providing said terminating network element with access to automatic recall-related information of an automatic recall service stored in said service switching point, said system comprising:

said service switching point being operative to retrieve said automatic recall-related information from a line history block in said service switching point, to embed said automatic recall-related information in a message;

to retrieve an Open Route Directory Number (ORDN); and to route said message to said terminating network element using said ORDN; and said terminating network element being operative in response to receipt of said message from said service switching point to retrieve said automatic recall-related information from said message.

* * * * *